United States Patent [19]
Sadiq et al.

[11] Patent Number: 6,134,545
[45] Date of Patent: Oct. 17, 2000

[54] METHOD AND SYSTEM FOR PROCESSING A QUERY

[75] Inventors: Waqar Sadiq, Rochester Hills; Fred Arthur Cummins, Farmington Hills, both of Mich.; William Earl Swift, II, Frisco, Tex.

[73] Assignee: Electronics Data Systems Corporation, Plano, Tex.

[21] Appl. No.: 09/016,558

[22] Filed: Jan. 30, 1998

Related U.S. Application Data

[60] Provisional application No. 60/065,400, Nov. 13, 1997.

[51] Int. Cl.$^7$ .................................................. G06F 17/30
[52] U.S. Cl. ............................................. 707/3; 707/102
[58] Field of Search .............................. 707/3, 4, 5, 103, 707/10, 102

[56] References Cited

U.S. PATENT DOCUMENTS

| | | | |
|---|---|---|---|
| 5,201,047 | 4/1993 | Maki et al. | 707/5 |
| 5,873,107 | 2/1999 | Borovoy et al. | 707/501 |
| 5,890,147 | 3/1999 | Peltonen et al. | 707/3 |
| 5,893,090 | 4/1999 | Freidman et al. | 707/3 |
| 5,895,465 | 4/1999 | Guha | 707/4 |
| 5,897,632 | 4/1999 | Dar et al. | 707/2 |

*Primary Examiner*—Paul R. Lintz
*Assistant Examiner*—Frantz Coby
*Attorney, Agent, or Firm*—L. Joy Griebenow; Baker & Botts L.L.P.

[57] ABSTRACT

One aspect of the invention is a method for processing a query. The method comprises receiving a query requesting at least one specific attribute of selected ones of a plurality of objects satisfying a query criteria. The query is directed to a database containing state data for the plurality of objects. A data structure is generated in response to the query, the data structure comprising, for each object satisfying the query criteria, each specific attribute requested by the query and the identifier of the object, even if the identifier of the object was not requested as a specific attribute in the query.

21 Claims, 1 Drawing Sheet

METHOD AND SYSTEM FOR PROCESSING A QUERY

RELATED APPLICATIONS

This application claims the benefit of U.S. provisional application Ser. No. 60/065,400, which was filed on Nov. 13, 1997.

TECHNICAL FIELD OF THE INVENTION

This invention relates generally to object-oriented programming and more particularly to a method and system for processing a query.

BACKGROUND OF THE INVENTION

Some computer applications are so large and the number of users of the applications so large that it makes sense to divide up the work of the application among multiple computers and, potentially, to store the information used by the application in many different places. Such applications are commonly referred to as distributed applications. Conventional distributed applications store shared information in multiple databases that may reside on many different computers.

Recently, however, software developers have begun to create distributed object systems. Distributed object systems comprise objects shared in computer memory and one or more processes running on one or more computers. In distributed object systems, then, an additional shared resource, the distributed object, needs to be accounted for.

The processing of database queries presents a problem in distributed object systems. Because the contents of a database may be reflected in a plurality of shared objects, a query has the potential to create a high amount of overhead. Ordinarily, not all shared objects in a shared object system are stored in memory simultaneously. Instead, objects are activated and deactivated as needed. Thus, a query has the potential to cause a large number of objects to be activated, thus consuming a large amount of computing resources for such activation. In addition, one may later want to access other attributes of an object other than those requested by the query. It may be difficult to locate such attributes if only certain attributes of particular objects are returned from the database in response to the query.

SUMMARY OF THE INVENTION

The invention comprises a method and system for processing a query. The invention is particularly useful in distributed object systems but could be used in other types of systems. One aspect of the invention is a method of processing a query. A query is received requesting at least one specific attribute of selected ones of a plurality of objects satisfying a query criteria. The query is directed to a database containing state data for the plurality of objects. A data structure is generated in response to the query, the data structure comprising, for each object satisfying the query criteria, each specific attribute requested by the query and the identifier of the object, even if the identifier of the object was not requested as a specific attribute in the query.

The invention has several important technical advantages. By providing the identifier of each object from which data was retrieved in response to the query, the invention avoids the need to activate each object satisfying the query criteria in response to the query. In addition, by retrieving the object identifier, a distributed object system may readily activate a particular object if a process accessing the query results desires to do so. The invention is also facilitated by the use of an iterator capable of iterating over the data returned in response to the query as well as the objects associated with the data returned in response to the query. This dual function iterator provides a powerful tool that may be used by processes making reference to the query results. The invention also allows easy generation of object references in response to a request for an object associated with the query results. Objects associated with the query results may be efficiently activated only when needed (lazy activation), improving the efficiency of the distributed object system.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
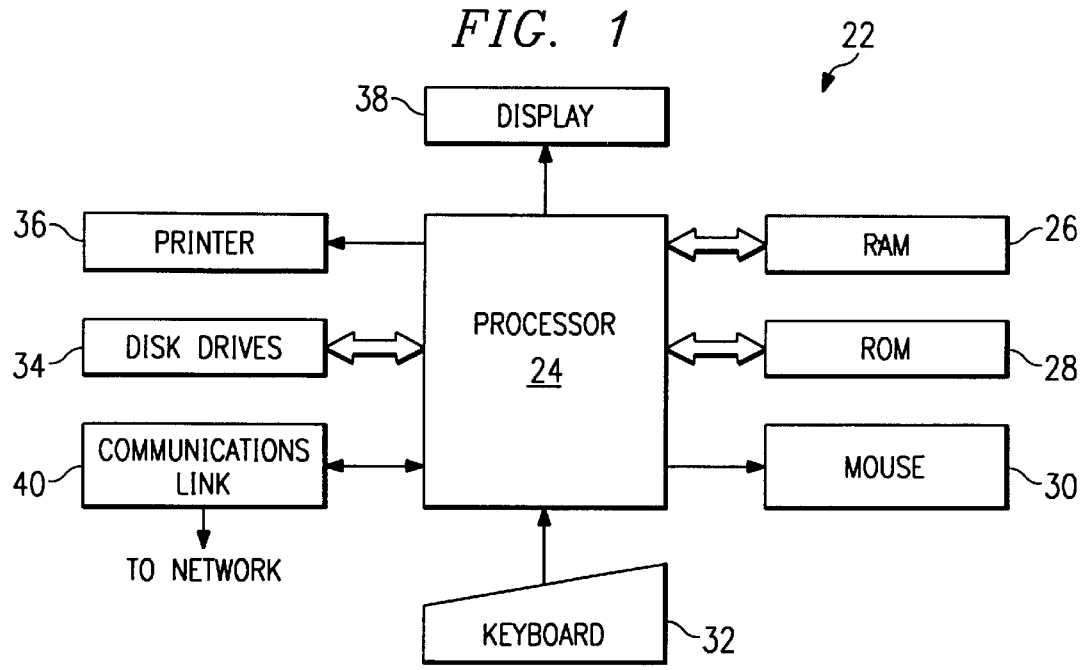
FIG. 1 illustrates an exemplary general purpose computer that may be used to implement the present invention.
Figure 2:
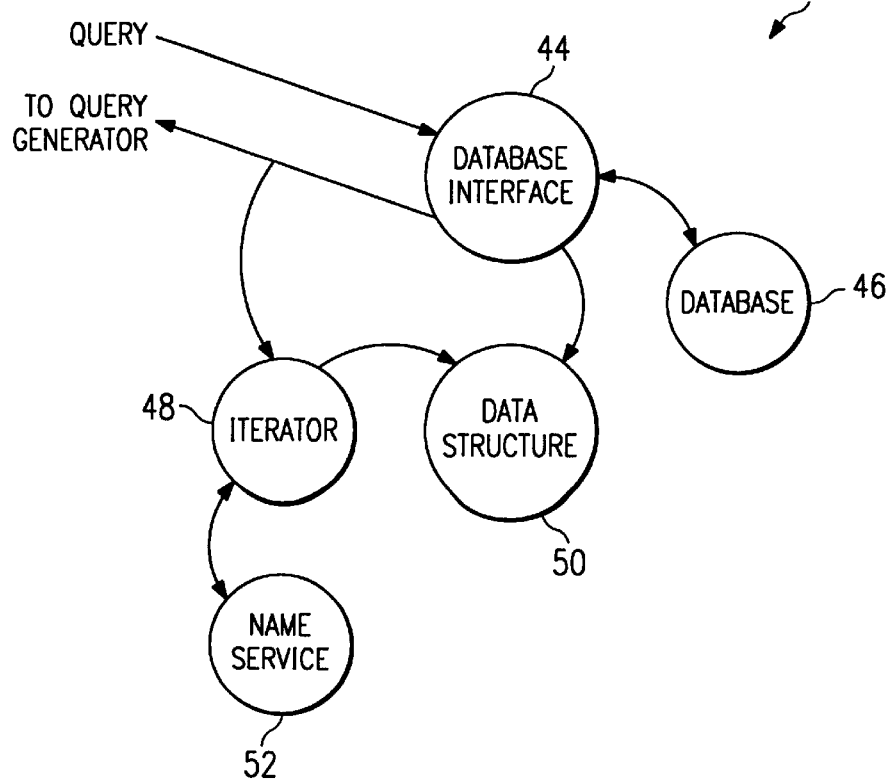
FIG. 2 illustrates an exemplary distributed object system constructed in accordance with the invention.

The preferred embodiment of the present invention and its advantages are best understood by referring to FIGS. 1–2 of the drawings, like numerals being used for like and corresponding parts of the various drawings.

FIG. 1 illustrates a general purpose computer 22 that may be used in a distributed object system created in accordance with the invention. The general purpose computer 22 may be used to execute distributed applications and/or distributed system services in accordance with the invention. General purpose computer 22 may also be used in object systems other than distributed object systems. General purpose computer 22 may be adapted to execute any of the well known OS2, UNIX, MAC-OS, and WINDOWS operating systems or other operating systems. General purpose computer 22 comprises processor 24, random access memory (RAM) 26, read-only memory (ROM) 28, mouse 30, keyboard 32, and input/output devices such as disk drives 34, printer 36, display 38, and communications link 40. The present invention includes programs that may be stored in RAM 26, ROM 28, or disk drives 34 and may be executed by processor 24. Communications link 40 connects to a computer network but could be connected to a telephone line, an antenna, a gateway or any other type of communications link. Disk drives 34 may include a variety of types of storage media, such as, for example, floppy disk drives, hard disk drives, CD ROM drives or magnetic tape drives. Although this embodiment employs a plurality of disk drives 34, a single disk drive 34 could be used without departing from the scope of the invention. FIG. 1 only provides one example of a computer that may be used with the invention. The invention could be used in computers other than general purpose computers, as well as on general purpose computers without conventional operating systems.

FIG. 2 illustrates an exemplary distributed object system 42 constructed in accordance with the invention. Although the invention may be used in any system employing shared objects, it is particularly useful in distributed object systems. Distributed object system 42 comprises a plurality of computers 22 (not explicitly shown) networked together. Any number of computers could be included without departing from the scope of the invention. Data for distributed objects may, for example, be maintained in one or more databases contained in storage media controlled by one or more of the computers 22.

Distributed object system 42 comprises a database interface 44 that receives a query request from a process (not explicitly shown). Database interface 44 further comprises a query processor operable to process the query. Such a query may be directed to a database such as database 46. Database interface 44 could interface with multiple databases 46 without departing from the scope of the invention.

Database interface 44 translates the query request received into a query understandable by database 46. A query may request one or more attributes to be retrieved for objects satisfying a particular query criteria. Any criteria could be used without departing from the scope of the invention. In this embodiment, the contents of database 46 represent the persistent state of shared objects for distributed object system 42. Accordingly, although a query is directed to database containing state data for objects, the query may be considered as requesting attributes of objects satisfying the query criteria.

Database interface 44 generates a data structure 50 in response to the query results received from database 46. Data structure 50 could be any type of data structure without departing from the scope of the invention. In this embodiment, data structure 50 comprises a list of name/value pair sequences where each sequence is associated with one of the objects satisfying the query. Each name/value pair comprises the name of an object attribute requested by the query and the value of that attribute for a specific object satisfying the query. Besides including the specific attributes requested by the query, data structure 50 also includes an identifier of each object satisfying the query criteria. The identifier is stored as one of the name/value pairs in the sequence. Where an identifier comprises multiple values, it may be stored as a plurality of name/value pairs in the sequence. The identifier could also be stored in a data structure separate from the name/value pair sequences. The identifier of each object is returned even if that identifier was not requested as a specific attribute in the query. The list, alternatively, could be implemented as one list of names as the names are common to each sequence. In such an embodiment, a list of sequences could also be provided that contains only the values wherein the sequence orders the values consistently with the list of names.

For example, a query of a set of person objects may request the height and weight of all men over age thirty. Database interface 44 would process this query request and generate a query that could be understood by database 46. This query would request database 46 to return the height, weight, and object identifier for all men over age thirty. In such an example, a person's social security number might serve as the object identifier. Thus, a particular name/value pair sequence in data structure 50 generated in response to this query may be a name/value pair for height, a name/value for weight, and a name/value pair for the social security number (the object identifier).

Because the invention returns the object identifier along with attributes specifically requested by a query, the invention avoids having to activate each object satisfying the query criteria. Instead, a form of lazy activation may be used which will be described below. In addition, the return of the object identifiers allows a powerful iterator 48 to be returned to the process generating the query.

Iterator 48 comprises a first plurality of methods operable to iterate over a plurality of sequences contained in data structure 50. Iterator 48 further comprises a second plurality of methods operable to iterate over a plurality of objects associated with the sequences in data structure 50. These methods may use the object identifiers in each sequence to iterate over the objects. Iterator 48 may include methods such as get next sequence, get previous sequence, get next N sequences, and get previous N sequences. These methods would be used to retrieve the next data sequence or set of sequences or the previous sequence or set of sequences in data structure 50. In addition, iterator 48 may include methods such as get next object, get previous object, get next N objects, or get previous N objects. These methods may be used to get the next object or series of objects or the previous object or series of objects using the object identifiers associated with each sequence in data structure 50. Thus, the invention provides a powerful iterator operable to iterate over data sequences (tuples) returned in response to the query or over objects associated with tuples returned in response to the query. Other types of methods may be included or some of these methods not included without departing from the scope of the invention.

When iterator 48 receives a request to iterate over objects, such an object will ordinarily not be currently activated (in memory). Thus, iterator 48 need not return a reference to the actual object. Instead, iterator 48 may use the object identifier for an object stored in a particular sequence in data structure 50 to obtain an object reference for the object from name service 52. Iterator 48 may then return the object reference in response to a process invoking one of the object iteration methods of iterator 48. Name service 52 may access a database associating object identifiers with the information required to generate object references. Name service 52 or iterator 48 could generate the actual object reference or another process could generate the object reference without departing from the scope of the invention.

Even when iterator 48 receives a request to iterate over the objects associated with data structure 50, the object reference returned in response to the request to iterator 48 may not necessarily be used by a process. Thus, the creation of an object reference and return to a process requesting an object from iterator 48 may not necessarily result in the activation of that object. Instead, the invention employs a system of lazy activation such that an object may be activated when a method is invoked on an object reference associated with the object. Various mechanisms may be used to activate the shared object associated with the object reference. Any method of activation can be used without departing from the scope of the invention.

In response to a query message, database interface 44 returns an iterator such as iterator 48. Other methods could be used to provide access to iterator 48 without departing from the scope of the invention. In addition, data structure 50 could be accessed by software other than an iterator without departing from the scope of the invention.

One example of where the invention could be used is in a computerized card catalog system for a library. In such a system, each book may comprise an object with a number of attributes for which a database provides persistent storage. Suppose, for example, that a process queries the database for the title of all books published after 1980 that relate to the subject of travel. An identification number might comprise the object identifier used to uniquely identify each book and be a primary key in database 46. Thus, the results of this query would result in data structure 50 comprising a name/value pair sequence for each book satisfying the query. In this example, there would be two name/value pairs in each sequence: one for the title of the book and one with the identification number that serves as the object identifier for the book. Iterator 48 could then be used to browse through this list.

For example, if one hundred books are returned but only ten titles fit on a screen at any one time, then iterator 48 could be used to browse through the list. Get next 10 tuples might be a method invoked to get the next 10 book titles to display on the screen. At some point, a user may desire more information about a particular book that he likes. At this point, the object identifier for a tuple could be used to retrieve the object identifier associated with the title. An object reference can then be generated using name service 52. This object reference could then be used to access more information about that particular book. Thus, iterator 48 provides a powerful mechanism to process query results and iterate over either objects or tuples satisfying the query.

Although the present invention has been described in detail, it should be understood that various changes, substitutions and alterations can be made hereto without departing from the spirit and scope of the invention as defined by the appended claims.

What is claimed is:

1. A method of processing a query, comprising:
    receiving a query requesting at least one specific attribute of selected ones of a plurality of objects satisfying a query criteria, the query directed to a database containing state data for the plurality of objects;
    generating a data structure in response to the query without retrieving an object satisfying the query criteria, the data structure comprising, for each object satisfying the query criteria, each specific attribute requested by the query and the identifier of the object, even if the identifier of the object was not requested as a specific attribute in the query.

2. The method of claim 1, further comprising:
    returning an iterator in response to the query, the iterator comprising methods capable of accessing the data structure and causing the generation of an object reference in response to an object identifier contained in the data structure.

3. The method of claim 2, wherein the object implementation associated with the object reference is not activated until the object reference is used to attempt to invoke a method of that object implementation.

4. The method of claim 2, wherein the data structure comprises a list of name/value pair sequences, each sequence associated with one of the plurality of objects satisfying the query, each name/value pair in the sequence comprising the name of one of the specific attributes requested by the query and the value of that specific attribute for the object associated with the sequence.

5. The method of claim 4, wherein each sequence further includes one or more name/value pairs where the one or more values comprise the object identifier of the object associated with the sequence.

6. The method of claim 5, wherein the object implementation associated with the object reference is not activated until the object reference is used to attempt to invoke a method of that object implementation.

7. The method of claim 2, wherein the object identifier may be used to obtain an object reference from a name service that can be used to generate the object reference.

8. The method of claim 1, wherein the data structure comprises a list of tuples, each tuple associated with one of the plurality of objects satisfying the query, each tuple comprising the name of one of the specific attributes requested by the query and the value of that specific attribute for the object associated with the sequence.

9. The method of claim 8, wherein each tuple further includes the object identifier of the object associated with the sequence.

10. A system for processing a query in a distributed object system, comprising:
    a query processor operable to receive a query requesting at least one specific attribute of selected ones of a plurality of objects satisfying a query criteria, the query directed to a database containing state data for the plurality of objects, and
    generate a data structure in response to the query without retrieving an object satisfying the query criteria, the data structure comprising, for each object satisfying the query criteria, each specific attribute requested by the query and the identifier of the object, even if the identifier of the object was not requested as a specific attribute in the query.

11. The system of claim 10, further comprising:
    an iterator operable to access the data structure and cause the generation of an object reference in response to an object identifier contained in the data structure.

12. The system of claim 11, wherein the object implementation associated with the object reference is not activated until the object reference is used to attempt to invoke a method of that object implementation.

13. The system of claim 11, further comprising:
    a name service accessible by the iterator and operable to return a string that may be used to generate an object reference in response to an object identifier.

14. The system of claim 11, wherein the data structure comprises a list of name/value pair sequences, each sequence associated with one of the plurality of objects satisfying the query, each name/value pair in the sequence comprising the name of one of the specific attributes requested by the query and the value of that specific attribute for the object associated with the sequence.

15. The system of claim 14, wherein each sequence further includes one or more name/value pairs where the one or more values comprise the object identifier of the object associated with the sequence.

16. The system of claim 15, wherein the iterator is operable to iterate over each sequence or iterate over objects associated with the object identifiers contained in the data structure.

17. An iterator, comprising:
    a first plurality of methods stored on a first computer readable storage medium, the first plurality of methods operable to iterate over a plurality of sequences contained in a data structure;
    a second plurality of methods stored on a second computer readable storage medium, the second plurality of methods operable to iterate over a plurality of objects associated with a plurality of object identifiers, wherein each sequence comprises an object identifier, wherein each method in the second plurality of method returns an object reference associated with one of the object identifiers.

18. The iterator of claim 17, wherein the first computer readable medium is the same as the second computer readable medium.

19. The iterator of claim 17,
    wherein the data structure is generated in response to a query requesting at least one specific attribute of selected ones of a plurality of objects satisfying a query criteria, the query directed to a database containing state data for the plurality of objects and
    wherein the data structure comprises, for each object satisfying the query criteria, each specific attribute requested by the query and the identifier of the object, even if the identifier of the object was not requested as a specific attribute in the query.

20. The iterator of claim 19, wherein the data structure comprises a list of name/value pair sequences, each sequence associated with one of the plurality of objects satisfying the query, each name/value pair in the sequence comprising the name of one of the specific attributes requested by the query and the value of that specific attribute for the object associated with the sequence; and wherein the each sequence further includes one or more name/value pairs where the one or more values comprise the object identifier of the object associated with the sequence.

21. The iterator of claim 18, wherein the object implementation associated with an object reference generated by the iterator is not activated until the object reference is used to attempt to invoke a method of that object implementation.

* * * * *